US010417017B2

United States Patent
Duan et al.

(10) Patent No.: US 10,417,017 B2
(45) Date of Patent: Sep. 17, 2019

(54) DETERMINING CANDIDATE PATCHES FOR A COMPUTER SOFTWARE

(71) Applicant: International Business Machines Corporation, Armonk, NY (US)

(72) Inventors: Zi Hui Duan, Beijing (CN); Lu Sun, Beijing (CN); Jing Jing Wei, Beijing (CN); Dian Guo Zou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 15/465,090

(22) Filed: Mar. 21, 2017

(65) Prior Publication Data

US 2018/0275981 A1    Sep. 27, 2018

(51) Int. Cl.
  *G06F 9/448*   (2018.01)
  *G06F 8/658*   (2018.01)
  *G06F 8/71*    (2018.01)
  *G06F 8/77*    (2018.01)

(52) U.S. Cl.
  CPC ............ *G06F 9/4488* (2018.02); *G06F 8/658* (2018.02); *G06F 8/71* (2013.01); *G06F 8/77* (2013.01)

(58) Field of Classification Search
  CPC ............ G06F 8/65; G06F 8/71; G06F 9/4428
  See application file for complete search history.

(56) References Cited

U.S. PATENT DOCUMENTS

| | | |
|---|---|---|
| 7,788,661 B2 | 8/2010 | Axnix et al. |
| 8,028,271 B2 | 9/2011 | deVries et al. |
| 8,407,687 B2 | 3/2013 | Moshir et al. |
| 9,052,983 B2 | 6/2015 | Farchi et al. |
| 2008/0307407 A1* | 12/2008 | Wagner ............. G06F 8/61 717/172 |
| 2010/0169874 A1* | 7/2010 | Izard ............. G06F 8/60 717/170 |
| 2014/0281665 A1 | 9/2014 | Hey et al. |
| 2018/0011700 A1* | 1/2018 | Plate ............. G06F 8/65 |

OTHER PUBLICATIONS

Lin et al., AutoPaG: Towards Automated Software Patch Generation With Source Code Root Cause Identification and Repair, Mar. 20-22, 2007, Retrieved from Internet: URL:https://www.utdallas.edu/~zxl111930/file/AutoPaG.pdf, 12 pages.

* cited by examiner

*Primary Examiner* — Wei Y Zhen
*Assistant Examiner* — Amir Soltanzadeh
(74) *Attorney, Agent, or Firm* — Schmeiser, Olsen & Watts, LLP; William Hartwell

(57) ABSTRACT

A method, computer system, and computer program product for determining a candidate patch for computer software is provided. According to a method, fingerprint(s) of patch(es) for a computer software is obtained first, wherein a fingerprint of a patch comprises function(s) being revised in the computer software if the patch is installed into the computer software. Then whether every function in the obtained fingerprint(s) of patch(es) has been called is monitored in response to beginning of execution of the computer software along to code path(s) related to bug(s). And at last candidate patch(es) is determined in response to end of the execution of the computer software along to the code path(s) related to the bug(s), wherein every function in the fingerprint of the candidate patch(es) has been called during the execution of the computer software.

15 Claims, 4 Drawing Sheets

DETERMINING CANDIDATE PATCHES FOR A COMPUTER SOFTWARE

TECHNICAL FIELD

The present invention relates to the field of software testing, and more specifically, to determining candidate patches for a computer software.

BACKGROUND

Patches for a computer software are used to correct wrong logic, e.g. bugs in the computer software. The bugs may cause the wrong behavior, security issues, or crashed programs in the computer software. The patches are usually provided by a manufacturer of the computer software to fix the bugs. With more and more bugs being found inside software, more and more patches have been developed for software, especially for a software which is used widely or a software which has been existed for a long time.

SUMMARY

Example embodiments of the present disclosure disclose a method, a system, and a computer program product for determining candidate patches for a computer software. A processor of a computing system obtains fingerprint(s) of patch(es) for a computer software, wherein a fingerprint of a patch comprises function(s) being revised in the computer software when the patch is installed into the computer software. Whether every function in the obtained fingerprint(s) of patch(es) has been called in response to a beginning of execution of the computer software along to code path(s) related to bug(s) is monitored. Candidate patch(es) are determined in response to an end of the execution of the computer software along to the code path(s) related to the bug(s), wherein every function in the fingerprint of the candidate patch(es) has been called during the execution of the computer software.

DETAILED DESCRIPTION

As used herein, the term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

In an aspect of the invention, a computer-implemented method is disclosed. According to the method, fingerprint(s) of patch(es) for a computer software is obtained first, wherein a fingerprint of a patch comprises function(s) being revised in the computer software if the patch is installed into the computer software. Then, whether every function in the obtained fingerprint(s) of patch(es) has been called is monitored in response to beginning of execution of the computer software along to code path(s) related to bug(s). And at last candidate patch(es) is determined in response to end of the execution of the computer software along to the code path(s) related to the bug(s), wherein every function in the fingerprint of the candidate patch(es) has been called during the execution of the computer software.

In another aspect, a system is disclosed. The system may include a processing unit and a memory coupled to the processing unit and storing instructions thereon. The instructions is capable of performing the above computer-implemented method.

In yet another aspect, a computer program product is disclosed. The computer program product is tangibly stored on a non-transient machine-readable medium and may comprise machine-executable instructions. When executed on a device, the instructions may cause the device to perform the above computer-implemented method.

Figure 1:
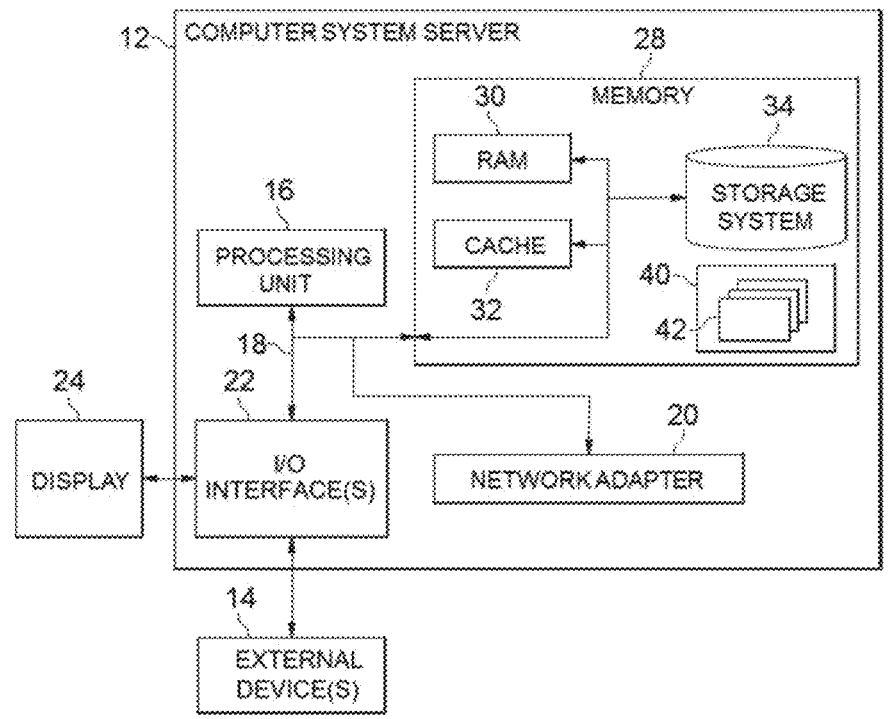
FIG. 1 is a block diagram of a computing system, in accordance with embodiments of the present invention.

Referring to the drawings, FIG. 1 is a block diagram of a computing system, in accordance with embodiments of the present invention. FIG. 1 depicts an exemplary electronic device or computer system/server 12 which is applicable to implement the embodiments of the present disclosure. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media, which may be any available media that is accessible by computer system/server 12, and includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set or at least one of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drive redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

It is appreciated that the computer system/server 12 as illustrated in FIG. 1 is only an example of the computing device in which the embodiments of the present disclosure may be implemented. The embodiments of the present disclosure may be implemented in other computing device or computing system.

In the following description, the terms "patch", "patches", "software patches" and "code patches" may have the same meaning and are used without distinction.

When users buy a software, the users may deploy the software and run the software in a production system. When the software runs into a wrong logic, the software may perform some unexpected behaviors or show unexpected status, including but not limited to: the response time of the software may become slower the system may get crashed. Up to now, some pieces of exception information provided by the software cannot be used to describe what problems the software have. Thus, identifying the root cause of the problems from the exception information may be difficult. Then, determining suitable patches to be used for the software to solve user problems may also be difficult for the users.

One reason for the users to have difficulties to determine suitable patches to be installed in the software may be that the users often want to maintain the users' product environment in a controlled mode, (i.e. the users would like to install exact patches for the users' current issues), and will not install all patches to the users' production environment in most cases. Thus, if there is a problem in the software, identifying which patches could be selected from those large number of patches to solve the problem exactly may be difficult for the users.

Figure 2:
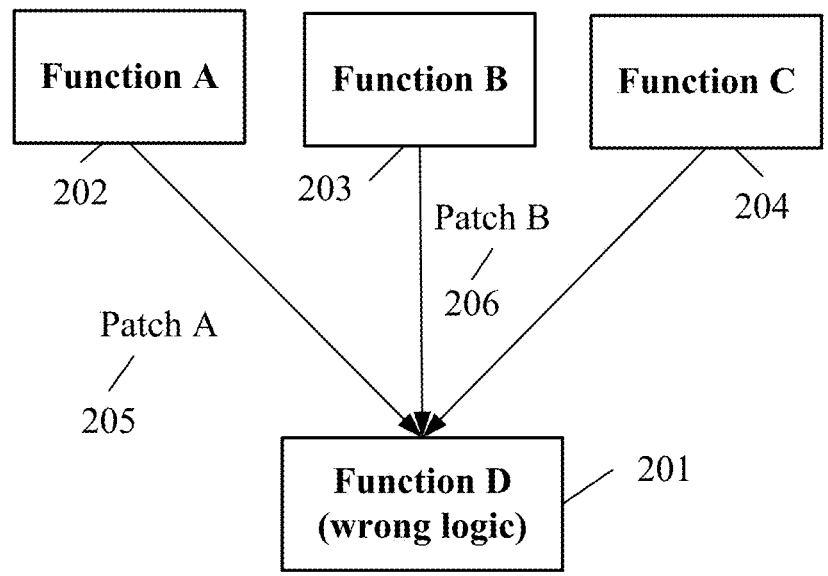
FIG. 2 shows an exemplary scenario of wrong logic occurring in a software, in accordance with embodiments of the present invention.

Another reason for the users to have difficulties to determine suitable patches to be installed in the software may be that currently only descriptions of a patch can be provided for the users, such as what problem the patch can be used to solve, etc. These descriptions are usually very general, and knowing which patches can be used may be difficult for the users. FIG. 2 shows an exemplary scenario of wrong logic occurring in a software, in accordance with embodiments of the present invention. Referring to FIG. 2, three functions A (202), B (203), and C (204) invoke function D (201), which is a wrong logic. The software manufacturer provides Patch A (205) and Patch B (206) for the software. The description for Patch A (205) is what problems can be solved in Function A (202) while the description for Patch B (206) is what problems can be solved in Function B (203). Actually, the wrong logic in Function D (201) has been revised both in Patch A (205) and Patch B (206). When the users find that function C (204) cannot get an expected result, the users may try to find solutions from the descriptions of available patches (e.g. the descriptions of Patch A (205) and Patch B (206)). But the users may find that the users cannot find patches to solve the problems in Function C (204), although in fact, either Patch A (205) or Patch B (206) can be used to solve the users' problems in Function C (204). Therefore, only the description of a patch cannot determine which patches can exactly solve users' problem(s).

Usually the computer software has been tested much before the software is sold, so when the software is working in a user's production environment, the software seldom fails, let alone crashes. The general failure for the software may be that the software's functionality works incorrectly.

There are two existing ways of software programming, one is object-oriented programming and another is process oriented programming, and the first one may be considered mainstream in recent 20 years. In both kinds of software programming, the functionality for the software may be shown by the software's functions. If functionality of a software works incorrectly, the logic in the functions of the software may have problems (e.g. there may be bugs in the functions of the software and patches for the software is required to fix the bugs to solve the problems), so the patches may revise the functions in the software.

In the following description, the object-oriented programming code may be used as an example. Process oriented programming code can be applied too, and any other suitable programming ways, either currently known or to be developed in the future, can be applied to use with embodiments of the present invention.

Now, some exemplary embodiments of the present disclosure can be described. First, fingerprint of a patch can be defined with respect to embodiments of the present invention, which may comprise all functions being modified in the computer software when the patch is installed into the computer software. And those skilled in the art can understand that a function may be presented as a method in a specific class and in a specific package for object-oriented programming code. Following is an exemplary fingerprint of patch001 which is for an object-oriented programming code.

| | |
|---|---|
| Patch001, | package A : class B : method C |
| | package D : class E : method F |
| | package D : class E : method H |

The example above is for purposes of illustration, and thus not intended to be exhaustive or limited to the embodiments disclosed.

There may be one or multiple available patches for a specific computer software. In one embodiment, the fingerprint(s) of the at least one patch for a computer software may be available from a repository, from a file, or from a network storage, etc. In an embodiment, a patch fingerprint repository may store all available patches for all available computer software. The users may obtain fingerprint of available patches for any computer software by querying the repository. In another embodiment, the fingerprint(s) of the at least one patch for a computer software may be stored in a data structure or in a file in a local storage or a network storage.

Figure 3:
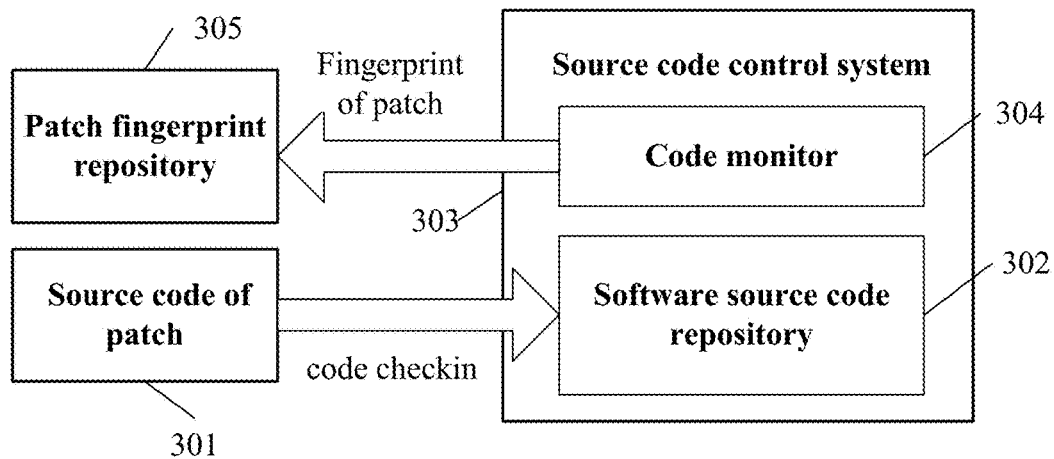
FIG. 3 is a block diagram of an environment for obtaining a fingerprint of a patch, in accordance with embodiments of the present invention.

FIG. 3 is a block diagram of an environment for obtaining a fingerprint of a patch, in accordance with embodiments of the present invention. Referring to FIG. 3, if source code of a patch (301) of a computer software can be available, a developer can check in the source code of the patch into original source codes of the computer software in a software source code repository (302) in a source code control system (303). The source code control system (303) may be installed in any appropriate electronic devices, examples of which include, but not limited to, one or more of the following: a desk computer, a portable computer, a tablet computer, a personal digital assistant (PDA), a cellular phone, a smart phone, etc. The patch can make some revisions to some methods in the original source code of the computer software during code check-in to get revised codes of the computer software. If the revised codes are compared with the original codes by a code monitor (304) in the source code control system (303), which codes have been revised can be known (e.g. which functions in the software have been revised, which methods, in which classes, and in which packages in object-oriented programming code have been revised). Those kinds of information could be collected by the source code control system (303) as fingerprint of the patch and sent to the patch fingerprint repository (305).

Figure 4:
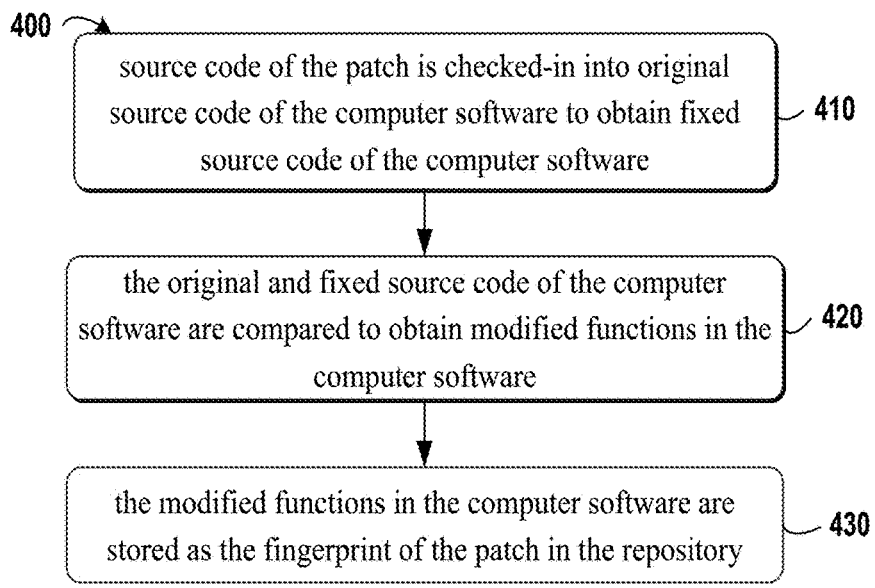
FIG. 4 is a flowchart of a method for obtaining a fingerprint of a patch, in accordance with embodiments of the present invention.

FIG. 4 illustrates a flowchart of a method 400 for obtaining a fingerprint of a patch, in accordance with embodiments of the present invention. The process begins when source code of the patch can be checked-in into original source code of the computer software to obtain revised source code of the computer software, which is illustrated at step 410. At step 410, source code of the patch can be checked-in into original source code of the computer software to obtain revised source code of the computer software. The source code of the patch can revise the wrong logic in the original source code of the computer software so that a revised source code of the computer software can be obtained.

Once the source code of the patch is checked-in into original source code of the computer software, the process continues and the original and revised source code of the computer software can be compared, which is illustrated at step 420. At step 420, the original and revised source code of the computer software can be compared to obtain revised functions in the computer software. The comparison can be done by an existing tool in the source code control system in FIG. 3, which is an existing technology and the details are omitted here.

Following the comparing of the original source code of the computer software with the revised source code of the computer software obtain revised functions, the process can store the revised functions in the computer software, which is illustrated at step 430. At step 430, the revised functions in the computer software can be stored as the fingerprint of the patch.

In some embodiments, the method 400 may be implemented by the code monitor (304) FIG. 3, for obtaining the fingerprint of the patch and then sending the fingerprint of the patch to a repository or a storage, alternatively the method 400 may be implemented by a component outside the source code control system for obtaining the fingerprint of the patch and then sending the fingerprint of the patch to a repository or a storage.

By way of example, a stored fingerprint of Patch001 can be shown below. The patches could be stored in a DB table or a XML database. These patches also can be stored as a XML file or any other file with text format in a storage:

| Patch name | fingerprint |
|---|---|
| Patch001, | package A : class B : method C |
| | package D : class E : method F |
| | package D : class E : method H |
| Patch002, | package I : class J : method K |
| | ... ... |
| Patch00n, | package X : class Y : method Z |

In some embodiments, the fingerprint of a patch may be input by a developer. Suppose bugs may be found in a computer software, and the bugs are related to some methods implementation, for example the bugs are related below methods:

| |
|---|
| package A: class B: method C |
| package D: class E: method F |
| package D: class E: method H |

The developer may find the bugs and revise those three methods to fix the bugs. Because the developer exactly knows which method in which class and in which package have been revised, the developer can input that information as the fingerprint for this patch as below.

| | |
|---|---|
| Patch001, | package A: class B: method C |
| | package D: class E: method F |
| | package D: class E: method H |

Any other suitable ways, either currently known or to be developed in the future, can be applied to obtain the fingerprint of the patch.

The fingerprints for all patches for a specific computer software can be released by the manufacturer of the computer software so that users can use the fingerprints to select suitable patches to satisfy the user's requirements. Besides, if the users can get the source code of the computer software and patches thereof, the users can get the fingerprints for patches for the computer software by themselves using above method.

When users buy a computer software, the users usually deploy the computer software to the user's production environment for running. If the users find some wrong behavior of the computer software, the user may install some patches to solve the user's problems. As mentioned before, the users would like to apply exact patches for the users' current issues, and will not apply all patches to the users' production environment in most cases. Therefore, there is a need to identify which patch(es) is a candidate patch(es) to solve the users' problems.

Figure 5:
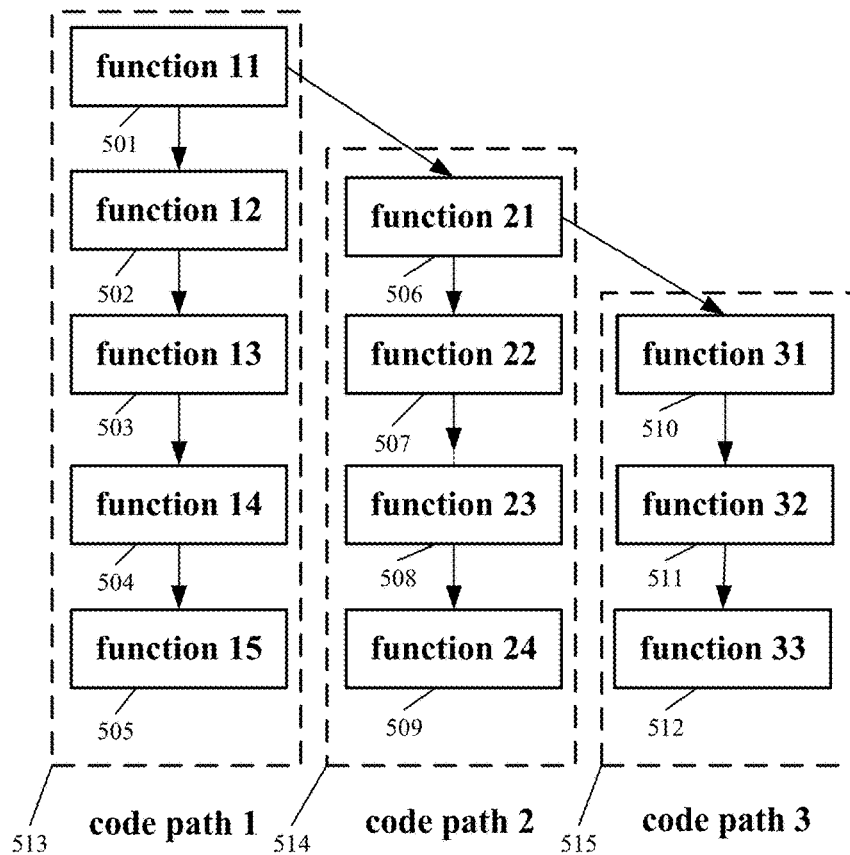
FIG. 5 shows three code paths in a computer software, in accordance with embodiments of the present invention.

FIG. 5 shows three code paths in a computer software, in accordance with embodiments of the present invention. Referring to FIG. 5, function 11-15 (501-505) are invoked sequentially in code path 1 (513), function 11 (501) and function 21-24 (506-519) are invoked sequentially in code path 2 (514), and function 11 (501), function 21 (506) and function 31-33 (510-512) are invoked sequentially in code path 3 (515). A patch is usually used to fix issues in a single code path. Suppose that patch 1 may be used to fix the bugs in code path 1 (513) (e.g. the issues in function 11-15 (501-505)), patch 2 may be used to fix the bugs in code path 2 (514, (e.g. the issues in function 11 (501) and function 21-24 (506-519)), and patch 3 may be used to fix the bugs in code path 3 (515) (e.g. the issues in function 11 (501), function 21 (506) and function 31-33 (510-512)). When the computer software is executed along the code path 2 (514), a user may find bugs and may want to fix the bugs. In one embodiment, the user may install only patch 2. In other words, if a monitor was used in the computer software to monitor which functions comprised in patch 1, patch 2 and patch 3, have been invoked during the computer software execution along the code path 2 which is related to the bugs, the monitor may find that function 11 (501) comprised in patch 1, patch 2 and patch 3, function 21 (506) comprised in patch 2 and function 22 (507) comprised in patch 2 have been invoked, thus patch 2 can be determined as candidate patch. Because a wrong logic is usually related to the bugs along the specific code path, a patch is usually related to the bugs. Therefore, every function in the fingerprint of candidate patch(es) has been called while at least one function in the fingerprint of non-candidate patch(es) has not been called during the execution.

Figure 6:
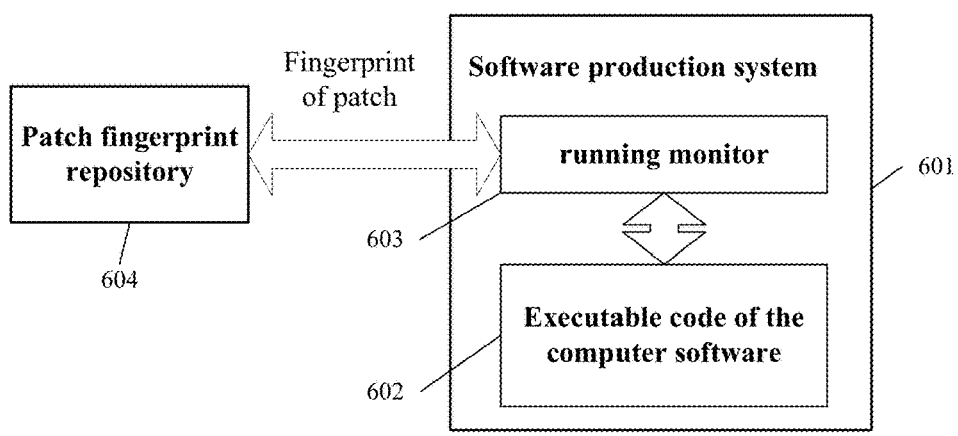
FIG. 6 is a block diagram of an environment for implementing a method for determining candidate patch(es), in accordance with embodiments of the present invention.

FIG. 6 is a block diagram of an environment for implementing a method for determining candidate patch(es), accordance with embodiments of the present invention. In FIG. 6, a software production system (601) is provided for execution of the computer software which is found to perform incorrectly along some specific code paths (e.g. the computer software have bugs along these specific code paths). In an exemplary embodiment, the administrator can start a method for determining candidate patch(es) for the computer software by inputting a request to the software production system (601), such as pressing a defined button. In another embodiment, the software production system (601) may start the method based on the method's configuration, for example, there may be an XML configuration file which configures the policy to start the process for determining candidate patch(es). The user can start to execute the computer software (602) along these code paths which may be related to the bugs again. In some embodiments, the user may remember type user's actions to the computer software to involve the bugs (e.g. the user may remember the code path(s) related to the bug(s)), such as which buttons have been pressed by the user, so the user can execute the computer software along the same code path(s) again. In other embodiments, the user may use a testing tool to remember the user's actions to the computer software to involve the bugs, so the user can know the code path(s) related to the bug(s), then the user can execute the computer software along the same code path(s) again. However, how to exactly define the code path(s) related to the bug(s) belong to the software testing. In some embodiments, a running monitor (603) in the software production system (601) can obtain fingerprint(s) of available patch(es) for the computer software by querying a patch fingerprint repository (604) in FIG. 6, in response to the method being active in response to the request from a user, such as the button is pressed by the user. The patch fingerprint repository (604) is provided in FIG. 6 for the purpose of illustration to help those of ordinary skilled in the art to understand and implement the present invention, without suggesting any limitation as to the scope of the invention. Fingerprint(s) of available patch(es) for a computer software can also be obtained by downloading the fingerprint(s) of available patch(es) from outside server, or by getting the fingerprint(s) of available patch(es) from internal storage. Then, the computer software may be executed along the specific code path(s) related to the bug(s) in the software production system, and in response to beginning of the execution of the computer software, the running monitor (603) in the software production system (601) can start to monitor the computer software execution and record the running status related to the obtained patches.

Generally, not all functions of the computer software can be called during execution of the computer software along some specific code paths related to bugs, actually, only part of functions, which along the specific code paths related to the bugs may be called. The issues in the computer software may involve only some functions in the software. The running status recorded by the running monitor can be used to identify which patch(es) may be related to the bugs in these specific code paths of the computer software. Thus, in one embodiment, a pointer or a flag can be set as a specific value, such as "0" for a function in a fingerprint of a patch obtained to record whether the function has been called during the execution. Every function in fingerprints of every patch can have a pointer or flag. For example, suppose the following patches could be obtained for the computer software, each pointer/flag for each function can be set as "0":

| | | |
|---|---|---|
| Patch001, | package A: class B: method C | pointer/Flag:0 |
| | package D: class E: method F | pointer/Flag:0 |
| | package D: class E: method H | pointer/Flag:0 |
| Patch002, | package I: class J: method K | pointer/Flag:0 |
| ... ... | | |
| Patch00n, | package X: class Y: method Z | pointer/Flag:0 |

When the computer software with bugs begins to execute along the specific code paths under the instruction of the administrator or the system in the software production system, the running monitor may monitor whether every function in the fingerprint of every patch has been called during the execution. If a function is called, the corresponding point or flag of the function can be set as another specific value, such as "1". For example, the running monitor may collect the monitoring results as below:

| | |
|---|---|
| Patch001, | package A: class B: method C  pointer/Flag:1 |
| | package D: class E: method F  pointer/Flag:1 |
| | package D: class E: method H  pointer/Flag:1 |
| Patch002, | package I: class J: method K  pointer/Flag:0 |
| ... ... | |
| Patch00n, | package X: class Y: method Z  pointer/Flag:0 |

A specific value is set to "0" or "1" can be just for the purpose of illustration to help those of ordinary skilled in the art to understand and implement the present invention, without suggesting any limitations as to the scope of the invention.

From above examples, three methods C, F, H are all comprised in the fingerprint of Patch001, in other words, Patch001 have made revisions to these three methods. So Patch001 can be determined as a candidate patch. Patch001 can be the only patch that all of the patch's three methods in the patch's fingerprint were called during the execution of the computer software along the specific code paths with bugs, Patch002 and Patch00n are determined not to be candidate patches because at least one function in the fingerprints of the patches has not been called during the computer software execution along the code paths with bugs.

In a further embodiment, a counter can be used to replace the above pointer/flag, which can be initiated as "0" for every function(s) in fingerprints of every patch. When the computer software starts to run along the specific code paths related to the bugs under the instruction of the administrator or the system, the running monitor may monitor how many times every function in the fingerprint of every patch has been called. If a function is called, the function's corresponding counter can accumulate a number of times the function is being called.

For example, the running monitor may collect the monitoring results as below:

| | |
|---|---|
| Patch001, | package A: class B: method C  counter:10 |
| | package D: class E: method F  counter:10 |
| | package D: class E: method H  counter:10 |
| Patch002, | package I: class J: method K  counter:1 |
| | package I: class J: method O  counter:1 |
| Patch003, | package Q: class S: method M  counter:5 |
| | package R: class T: method N  counter:0 |
| ... ... | |
| Patch00n, | package X: class Y: method Z  counter:0 |

From the above counters statistic data, Patch001 and Patch002 may be candidate patches while Patch003 and Patch00n may not be candidate patches in that all methods comprised in the fingerprints in Patch001 and Patch002 are called and at least one method comprised in the fingerprints in Patch003 and Patch00n are not called.

And because all three methods C, F, H comprised in fingerprints in Patch001 were called 10 times while both two methods C, I comprised in fingerprints in Patch002 are called once when the computer software run along the specific code paths related to bugs, so the Patch001 is the candidate for this wrong behavior with a higher probability level than Patch002 because Patch001 is called too frequently and it is more possible to cause the computer software to run incorrectly. Under this circumstance, the candidate patch(es) can be sorted according to accumulated number of times for every function in the obtained fingerprint(s) of the candidate patch(es) (i.e., the candidate patch(es) w with more accumulated number of times during the execution along the code paths related to the bugs has higher probability level to be determined as the candidate patch(es)). Optionally, the users can define a threshold for the number of times every function in the fingerprint of a patch has been called during the execution, if monitored number of times every function in the fingerprint of a patch has been called during the execution is bigger than the predefined threshold, the patch is candidate patch(es). And when the users get these two candidate patches, they can install Patch001 first, if it can solve the problems in the computer software, there is no need to install Patch002, otherwise, the users then install Patch002.

Figure 7:
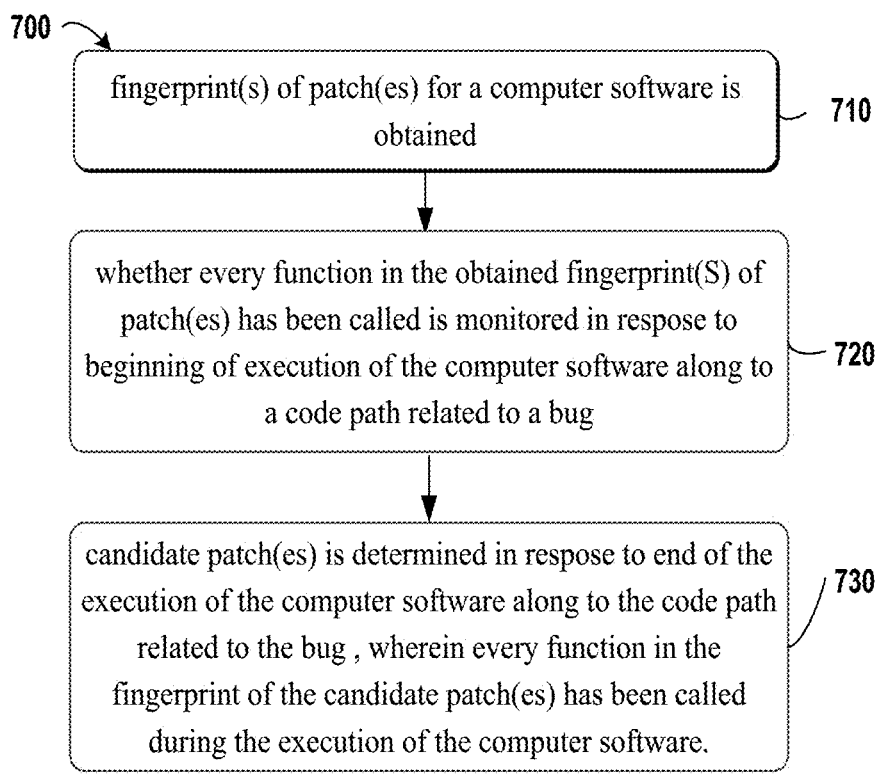
FIG. 7 is a flowchart of a method for determining candidate patch(es), in accordance with embodiments of the present invention.

FIG. 7 illustrates a flowchart of a method 700 for determining candidate patch(es), in accordance with embodiments of the present invention. The process begins when fingerprint(s) of patch(es) for a computer software is obtained, which is illustrated at step 710. At step 710, the fingerprint(s) of patch(es) for a computer software may be obtained. The fingerprint(s) of patch(es) may be obtained from remote storage or local storage. Optionally, the fingerprint(s) of patch(es) may be obtained from the patch fingerprint repository (604) shown in FIG. 6. Once the fingerprint(s) of patch(es) for a computer software is obtained, the process continues and may monitor whether every function in the fingerprint of every patch has been called, which is illustrated at step 720. At step 720, whether every function in the fingerprint of every patch has been called may be monitored in response to beginning of execution of the computer software along to code path(s) related to bug(s). The fact that the computer software is related to bugs along the specific code path(s) may be found by a user. Following the monitoring whether every function in the fingerprint of every patch has been called, the process may determine the candidate patch(es), which is illustrated at step 730. At step 730, candidate patch(es) may be determined in response to end of the execution of the computer software along to the code path(s) related to the bug(s), wherein every function in the fingerprint of the candidate patch(es) has been called during the execution of the computer software. As described herein, the method 700 may be implemented by the running monitor in FIG. 7 as a plugin of the software production system, for determining candidate patch(es), alternatively the method 700 may be implemented by a component outside the software production system for determining candidate patch(es).

In an exemplary embodiment, if at least one function in the fingerprint of patch(es) has not been called during the execution, the patch(es) is determined not to be candidate patch(es).

In some embodiments, whether every function in the obtained fingerprint of patch(es) has been called may be monitored in response to beginning of execution of the computer software along to code path(s) related to bug(s) is through accumulating number of times for every function in the obtained fingerprint(s) of patch(es) being called. And in some further embodiments, the candidate patch(es) can be sorted based on the accumulated number of times for every function in the obtained fingerprint(s) of the candidate patch(es). In some further embodiments, the candidate patch(es) with the higher accumulated number of times for every function in the fingerprint(s) of the candidate patch(es) can be determined to be the candidate patch(es) with higher probability level.

The method can be used to the process oriented computer software directly, in which the fingerprint of a patch only comprise method, not including class or package.

In an alternative embodiment, the software production system can install candidate patch(es) automatically in configuration time. In a further embodiment, the candidate patches are installed based on their sorting.

The present disclosure may be a system, an apparatus, a device, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams illustrate the architecture, functionality, and operation of possible implementations of systems, methods and computer program products according to various embodiments of the present disclosure. In this regard, each block in the flowchart or block diagrams may represent a module, snippet, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reversed order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific integrated Circuit (ASIC), designed for only implementing methods of the present invention).

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The claims are as follows:

1. A method for determining candidate patches for computer software, comprising:
   obtaining, by a processor of a computing system, fingerprint(s) of patch(es) for a computer software, wherein a fingerprint of a patch comprises function(s) being revised in the computer software when the patch is installed into the computer software;
   monitoring, by the processor, whether every function in the obtained fingerprint(s) of patch(es) has been called in response to a beginning of execution of the computer software along to code path(s) related to bug(s), wherein the monitoring includes accumulating a number of times for every function in the obtained fingerprint(s) of patch(es) being called;
   determining, by the processor, candidate patch(es) in response to an end of the execution of the computer software along to the code path(s) related to the bug(s) based on the number of times for every function in the obtained fingerprint is called being greater than a predefined threshold, wherein the patch(es) is further determined to be a candidate patch when every function in the fingerprint of the patch(es) has been called during the execution of the computer software, and the patch(es) is determined not to be a candidate patch when at least one function in the fingerprint of the patch has not been called during the execution of the computer software; and
   instructing, by the processor, the candidate patch to be installed into the computer software to revise one or more functionalities of the computer software previously working incorrectly.

2. The method according to claim 1, wherein the determining further comprises:
   sorting, by the processor, the candidate patch(es) based on the number of times for every function in the fingerprint(s) of the candidate patch(es).

3. The method according to claim 2, wherein the determining further comprises:
   determining, by the processor, the candidate patch(es) with a higher accumulated number of times for every function in the fingerprint(s) of the candidate patch(es) to be the candidate patch(es) with a higher probability level.

4. The method according to claim 1, wherein obtaining a fingerprint of a patch comprises:
   checking-in, by the processor, a source code of the patch into an original source code of the computer software to obtain a revised source code of the computer software;
   comparing, by the processor, the original source code and the revised source code of the computer software to obtain a plurality of revised functions in the computer software; and
   storing, by the processor, the plurality of revised functions as the fingerprint of the patch.

5. The method according to claim 1, wherein a function in the fingerprints of the patch are presented as a specific method in a specific class in a specific package for the computer software, using object-oriented programming code.

6. A computer system comprising:
   a processor;
   a memory device coupled to the processor; and
   a computer readable storage device coupled to the processor, wherein the storage device contains program code executable by the processor via the memory device to implement a method for determining candidate patches for computer software, the method comprising:
      obtaining, by a processor of a computing system, fingerprint(s) of patch(es) for a computer software, wherein a fingerprint of a patch comprises function(s) being revised in the computer software when the patch is installed into the computer software;
      monitoring, by the processor, whether every function in the obtained fingerprint(s) of patch(es) has been called in response to a beginning of execution of the computer software along to code path(s) related to bug(s), wherein the monitoring includes accumulating a number of times for every function in the obtained fingerprint(s) of patch(es) being called;
      determining, by the processor, candidate patch(es) in response to an end of the execution of the computer software along to the code path(s) related to the bug(s) based on the number of times for every function in the obtained fingerprint is called being greater than a predefined threshold, wherein the patch(es) is further determined to be a candidate patch when every function in the fingerprint of the patch(es) has been called during the execution of the computer software, and the patch(es) is determined not to be a candidate patch when at least one function in the fingerprint of the patch has not been called during the execution of the computer software; and instructing, by the processor, the candidate patch to be installed into the computer software to revise one or more functionalities of the computer software previously working incorrectly.

7. The computer system according to claim 6, wherein the determining further comprises:
sorting, by the processor, the candidate patch(es) based on the number of times for every function in the obtained fingerprint(s) of the candidate patch(es).

8. The computer system according to claim 7, wherein the determining further comprises:
determining, by the processor, the candidate patch(es) with a higher accumulated number of times for every function in the fingerprint(s) of the candidate patch(es) to be the candidate patch(es) with a higher probability level.

9. The computer system according to claim 6, wherein obtaining the fingerprint of the patch comprises:
checking in, by the processor, a source code of the patch into an original source code of the computer software to obtain a revised source code of the computer software;
comparing, by the processor, the original source code and the revised source code of the computer software to obtain a plurality of revised functions in the computer software; and
storing, by the processor, the plurality of revised functions as the fingerprint of the patch.

10. The computer system according to claim 6, wherein a function in the fingerprints of the patch are presented as a specific method in a specific class in a specific package for the computer software, using object-oriented programming code.

11. A computer program product, comprising a computer readable hardware storage device storing a computer readable program code, the computer readable program code comprising an algorithm that when executed by a computer processor of a computing system implements a method for determining candidate patches for computer software, the method comprising:
obtaining, by a processor of a computing system, fingerprint(s) of patch(es) for a computer software, wherein a fingerprint of a patch comprises function(s) being revised in the computer software when the patch is installed into the computer software;
monitoring, by the processor, whether every function in the obtained fingerprint(s) of patch(es) has been called in response to a beginning of execution of the computer software along to code path(s) related to bug(s), wherein the monitoring includes accumulating a number of times for every function in the obtained fingerprint(s) of patch(es) being called;
determining, by the processor, candidate patch(es) in response to an end of the execution of the computer software along to the code path(s) related to the bug(s) based on the number of times for every function in the obtained fingerprint is called being greater than a predefined threshold, wherein the patch(es) is further determined to be a candidate patch when every function in the fingerprint of the patch(es) has been called during the execution of the computer software, and the patch(es) is determined not to be a candidate patch when at least one function in the fingerprint of the patch has not been called during the execution of the computer software, and
instructing, by the processor, the candidate patch to be installed into the computer software to revise one or more functionalities of the computer software previously working incorrectly.

12. The computer program product according to claim 11, wherein the determining further comprises:
sorting, by the processor, the candidate patch(es) based on the number of times for every function in the obtained fingerprint(s) of the candidate patch(es).

13. The computer program product according to claim 12, wherein the determining further comprises:
determining, by the processor, the candidate patch(es) with a higher accumulated number of times for every function in the fingerprint(s) of the candidate patch(es) to be the candidate patch(es) with a higher probability level.

14. The computer program product according to claim 11, wherein obtaining the fingerprint of the patch comprises:
checking in, by the processor, a source code of the patch into an original source code of the computer software to obtain a revised source code of the computer software;
comparing, by the processor, the original source code and the revised source code of the computer software to obtain a plurality of revised functions in the computer software; and
storing, by the processor, the plurality of revised functions as the fingerprint of the patch.

15. The computer program product according to claim 11, wherein a function in the fingerprints of the patch are presented as a specific method in a specific class in a specific package for the computer software, using object-oriented programming code.

* * * * *